Sept. 23, 1958     J. G. KAY ET AL     2,853,176
ORIENTER
Filed Feb. 10, 1955
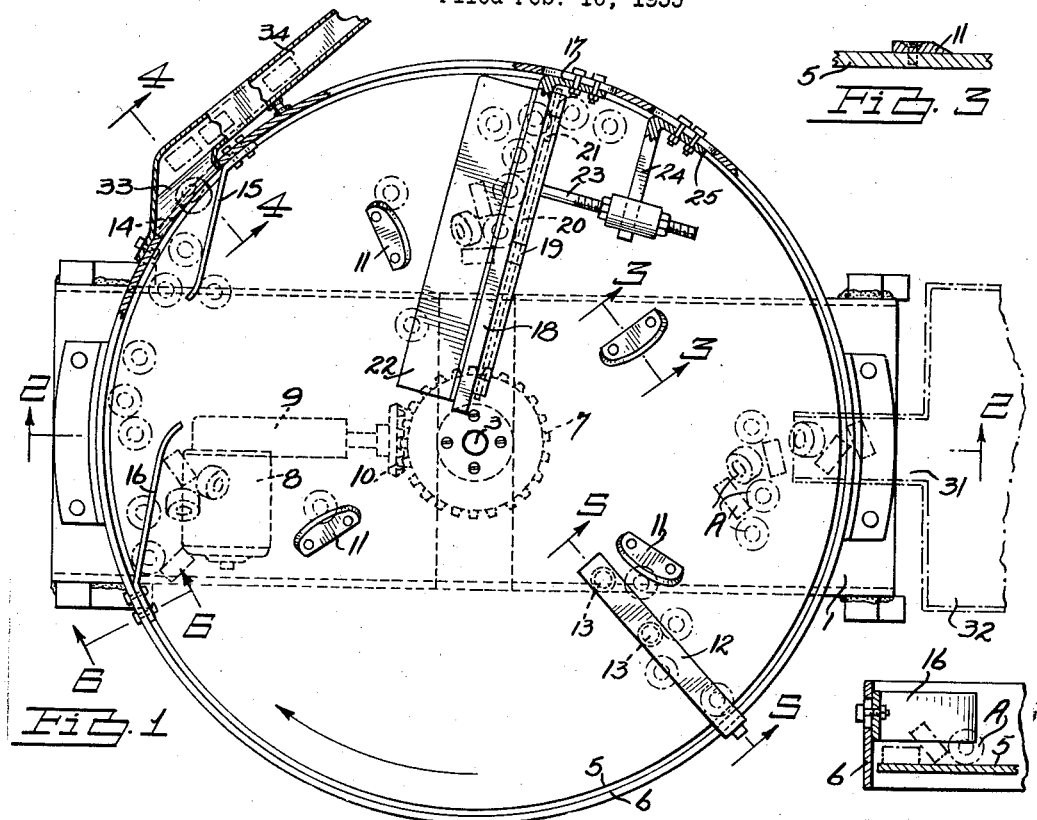
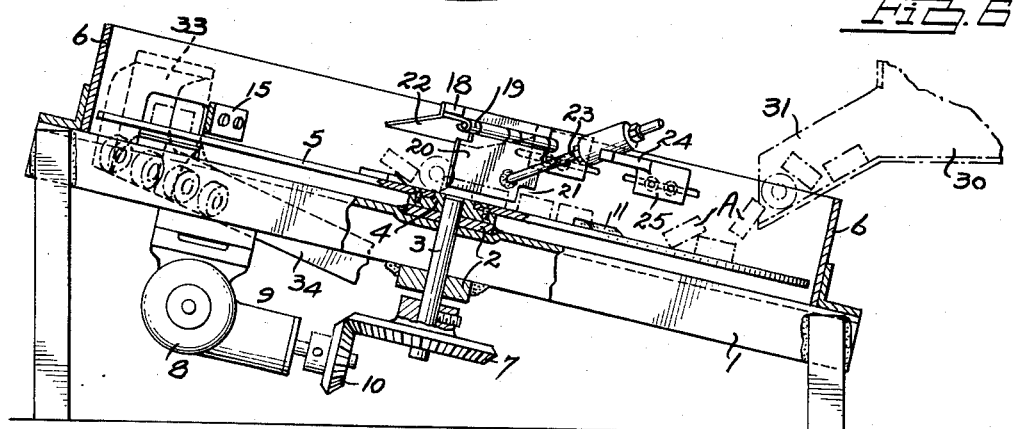
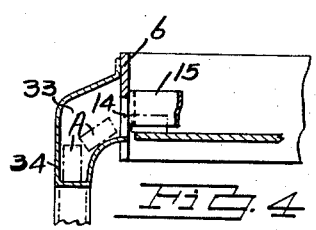
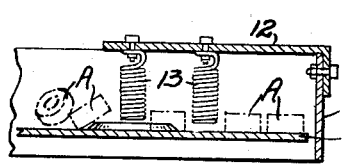
INVENTOR.
John G. Kay
by John K. Frye
George W. Baldwin
Attorney

United States Patent Office 2,853,176
Patented Sept. 23, 1958

2,853,176

ORIENTER

John G. Kay, Detroit, and John K. Rye, Southfield Township, Oakland County, Mich., assignors, by mesne assignments, to F. Jos. Lamb Company, a corporation of Michigan Application February 10, 1955, Serial No. 487,324

10 Claims. (Cl. 198—33)

This invention relates to improvements in orienters. It is an object of the invention to provide an orienter including a rotary disc mounted about an inclined axis onto which workpieces are adapted to be dropped, and to utilize the inclination of the disc in cooperation with physical means extending thereover for increasing the speed of orientation and the tendency for workpieces to travel toward the periphery of the disc for discharge therefrom. The inclination of the disc also decreases the tendency for circular workpieces to roll thereon. Again there are instances when workpieces are to be dipped or coated, in which event the orienter may be arranged that the lower portion of the disc is submerged and its high side, from which the workpieces are discharged, positioned above the level of the dip or coating.

Another object of the invention is to provide such an orienter wherein an annular wall is outwardly spaced around the periphery of the disc, so that dirt, cutting compound or other matter upon the disc may drop between the latter and the wall as workpieces move outwardly thereover.

A further object of the invention is to provide such an orienter wherein the rotary disc is readily interchangeable so that a differently surfaced disc may be quickly substituted to increase or decrease the tendency for workpieces to move thereon according to their nature and shape.

Having thus briefly stated some of the objects and advantages of the invention I will now describe it in detail with the aid of the accompanying drawing, in which:

Figure 1 shows a plan view of the invention.
Figure 2 is a section on the line 2—2 of Figure 1.
Figure 3 is an enlarged section on the line 3—3 of Figure 1, and
Figures 4, 5 and 6 are sections on the line 4—4, 5—5 and 6—6, respectively, of Figure 1.

Referring to the drawing, 1 designates a stand which is preferably rectangular and higher at one extremity than the other. Secured to the stand 1 substantially centrally of its length and width are aligned bearings 2 the axis of which extends at about 10 to 15 degrees to the vertical and at right angles to the upper surface of the stand. Mounted for rotation in the bearings 2 is a shaft 3 having an annular flange 4 fixed thereon on which a removable disc 5 is suitably secured. The disc is positioned somewhat above the top of the stand 1 and supported upon the latter and spaced coaxially around the disc 5 is an annular wall 6. Suitable means are provided for rotating the shaft 3 at a relatively slow speed. In the instance shown the shaft 3 projects beneath the bearings 2 and has a bevel gear 7 fixed on its lower extremity. Mounted on the stand 1 is a motor 8 which drives a speed reduction unit 9 on the output shaft of which a bevel pinion 10 is secured which meshes with the bevel gear 7.

Secured upon the disc 5 and usually spaced at different distances from its axis are a plurality of relatively thin cleats 11 the front extremities of which are forwardly and downwardly inclined in the direction of rotation of the disc. Mounted on the annular wall 6 and extending toward the axis of the disc 5 is an arm 12 which dependingly supports a plurality of resilient spreaders 13, each consisting of a helical spring the lower extremity of which terminates just above the disc.

Formed through the annular wall 6 and extending above the disc 5 is a discharge opening 14, and secured to the wall 6 past the opening 14 relative to the direction of rotation of the disc is a plow 15 the underside of which is adjacent but spaced slightly above the disc. The plow extends from the wall 6 substantially in the direction opposite to that in which the disc rotates and at only a relatively slight inclination to an imaginary line tangent to the annular wall at the point of contact of the plow therewith. Secured to the annular wall, preferably for vertical adjustment thereon is an orienting bar 16 consisting of a plow-like member which extends inwardly over the disc 6 and somewhat in the direction of rotation of the latter so that its extremity remote from the wall is a greater radial distance from the latter than is the outer extremity of the plow. The orienting bar 16 is, relative to the direction of rotation of the disc, in front of the plow and its underside is sufficiently spaced above the disc to permit properly oriented workpieces A to pass beneath it. The outer face of the bar contacts improperly oriented workpieces and pushes them toward the center of the disc and in some cases orients them in so doing. Workpieces which pass beneath the bar are engaged by the plow 15 and deflected thereby to the opening 14.

Mounted for limited arcuate adjustment around the annular wall 6 is a flange 17 inwardly from which in a generally radial direction a carrier arm 18 extends. The arrangement of the arm 18 is such that in all adjusted positions of the flange 17 the outer extremity of the arm is an advance of an imaginary line extending from the axis of the disc through the inner extremity of the said arm. Mounted on hinges 19 secured to the arm 18 is a depending deflector plate 20, and formed in the underside of the plate for a short distance from its outer extremity is an open-ended slot 21. Thus workpieces A carried against the plate 20 upon the rotating disc 5 tend to travel outwardly against the said plate, and this tendency is increased by the inclination of the disc 5, to the slot 21 through which they pass if properly oriented. Again during their travel outwardly against the deflector plate improperly positioned workpieces in many cases become properly oriented.

If a large number of workpieces collect in front of the deflector plate they may cause the latter to swing about its hinges 19 sufficiently to permit at least some of them to pass beneath it. Otherwise one of the cleats 11 on the disc will carry the workpieces with it and move the deflector plate about its hinges. Extending forward from the deflector plate 20 is a weighted arm 23 which is substantially horizontal when the plate is in its normal vertical position, and projecting beneath the arm 23 is a stop 24. This stop extends inwardly from a flange 25 mounted on the annular wall 6 for arcuate adjustment so that it may be located to support the arm 23 at all adjusted positions of the flange 17. Mounted also on the carrier arm 18 is a skimmer 22 which extends somewhat downwardly in the direction from which the workpieces approach the deflector plate. The skimmer is substantially the same length as the deflector plate and its purpose is to restrain the advance of workpieces which are upended against or rest upon one another, thereby in many instances properly orienting them so that they may pass through the slot 21 after moving outwardly against the plate 20.

30 indicates a hopper suitably supported, by means not shown, above and usually to one side of the stand 1, and extending from the bottom of the hopper is a downwardly inclined spout 31 which terminates above the disc 5, and preferably over the lower portion of the latter between the deflector plate 20 and the spreaders 13. If a number of workpieces from the spout land close together, or upon one another, and come in contact with the spreaders the latter, by their resilience, spread them over a wider area so that they rest directly upon the disc and in some cases become properly oriented. After they have passed the spreaders 13 any properly oriented workpieces sufficiently close to the periphery of the disc pass beneath the bar 16 and are guided by the plow 15 to the opening 14. Improperly oriented workpieces which are sufficiently close to the disc axis strike the outer face of the orienting bar and in some cases are oriented thereby and are carried beneath it, and the remainder are diverted toward the axis of the disc, so that they and other workpieces nearer to the disc axis pass to the deflector plate 20 by which they are usually properly oriented and laterally diverted to the slot 22 through which they pass in position to travel beneath the bar 16. Orientation of the workpieces by the orienting bar and the deflector plate is rendered much easier and speedier due to the inclination of the disc upon which the workpieces travel. It will also be noted that the cleats also function to compel movement with the disc if workpieces collect against either the orienting bar or the spreaders.

Mounted on the outer face of the annular wall 6 over the opening 14 is a chute 33 through which the workpieces pass to a suitable runway or conveyor 34. In the present instance, as shown in Figure 4, the chute is downturned and so shaped that the workpieces, which are shown circular, land on their peripheries upon the runway which is downwardly inclined from the chute.

While in the foregoing the preferred embodiment of the invention has been described and shown, it is understood that alterations and modifications may be made thereto provided the said alterations and modifications fall within the scope of the appended claims.

What we claim is:

1. An orienter comprising a stand, a disc mounted for rotation thereon including means for rotating the disc, an annular wall mounted on the stand around the disc, a plow extending from the wall partway over the disc to divert workpieces travelling thereon through an opening formed through said wall, and an orienting bar extending from the wall over the disc, said bar being positioned to prevent unoriented workpieces on the disc passing to the plow and to permit oriented workpieces on said disc to pass beneath said bar to said plow, in combination with a deflector plate extending over the disc and positioned to deflect workpieces thereon toward the discs periphery, means extending inwardly from the wall supporting the plate, and the lower margin of the plate having a slot formed in its outer extremity through which properly oriented workpieces are adapted to pass.

2. The combination in claim 1, including a skimmer extending from the deflector plate adjacent the top thereof and in the direction from which workpieces approach the plate.

3. The combination in claim 1, wherein the deflector plate is dependingly and pivotally mounted on its supporting means.

4. The combination in claim 1, wherein cleats are secured on the disc, and the deflector plate is pivoted on its supporting means, said cleats being adapted to engage workpieces halted against the deflector plate and force them against and past the plate by turning the latter its pivot axis.

5. The combination in claim 1, wherein the deflector plate is pivoted on its supporting means, and means for normally retaining the plate vertical and depending from its supporting means.

6. The combination in claim 1, wherein the supporting means for the deflector plate is mounted on the wall for arcuate adjustment whereby said plate is adjustable in a plane parallel with the upper face of the disc.

7. An orienter including a stand, a disc mounted for rotation thereon about an inclined axis whereby one side of the disc is higher than the other, an annular wall on the stand around the disc, a plow extending from the wall over the disc to divert workpieces travelling thereon to an opening formed through the wall, an orienting bar extending from the wall over the disc to prevent unoriented workpieces passing to the plow and spaced sufficiently above the disc to permit passage thereunder of oriented workpieces toward the plow, a deflector plate forwardly and outwardly inclined over the disc to divert workpieces on the disc toward the periphery of the latter and to orient workpieces on said disc, means extending from the wall for supporting the deflector plate, and the outer extremity of the plate having an open-ended slot formed in its underside to permit oriented workpieces on the disc adjacent its periphery to travel past said plate.

8. The combination in claim 7, wherein the deflector plate is pivoted on its supporting means about an axis substantially parallel with the portion of the disc over which it extends.

9. The combination in claim 7, wherein the deflector plate is pivoted on its supporting means, and means on the disc adapted to engage workpieces stopped by the deflector plate and force them against and to turn said plate about its pivot axis to permit passage of the workpieces past said plate.

10. The combination in claim 7, wherein the deflector plate is pivoted on its supporting means about an axis substantially parallel with that portion of the disc over which it extends, weighted means extending forwardly from the plate, and a stop extending inwardly from the wall for engaging said weighted means whereby said plate is normally held vertical.

References Cited in the file of this patent
UNITED STATES PATENTS

| | | |
|---|---|---|
| Re. 21,188 | Bounty | Aug. 29, 1939 |
| 1,558,079 | Duston | Oct. 20, 1925 |
| 1,842,053 | Small | Jan. 19, 1932 |
| 2,642,173 | Wehmiller | June 16, 1953 |